April 7, 1964   F. J. L. DORL   3,128,134
TRIPLE RACE TAPERED ROLLER BEARINGS
Original Filed July 7, 1961

INVENTOR
FRANCIS J. L. DORL
BY
ATTORNEYS

United States Patent Office 3,128,134
Patented Apr. 7, 1964

3,128,134
TRIPLE RACE TAPERED ROLLER BEARINGS
Francis J. L. Dorl, 17 Mountain Ave., Summit, N.J.
Original application July 7, 1961, Ser. No. 122,511.
Divided and this application Nov. 21, 1962, Ser. No. 245,344
2 Claims. (Cl. 308—174)

This application is a division of application Serial No. 122,511, filed July 7, 1961, now abandoned.

The invention relates to improvements on tapered roller bearings of the type illustrated, for example, in U.S. Patent No. 2,734,787, which have a reduced friction between the retaining or thrust flange and the thicker base of the tapered rollers, by creating a tapered roller bearing having a third race.

Tapered roller bearings and the rollers thereof are constructed as frustrums of cones in which the apex of the cones falls in the center of the shaft of rotation of the assembled tapered roller bearing as described in greater detail in connection with FIG. 1 of said Patent No. 2,734,787.

These bearings are normally composed of an inner bearing cone with a thrust flange, an outer bearing cup and a plurality of frustro-conical rollers having flat bases and a cage therebetween.

The thrust flange of the inner bearing cone usually bears directly against the base of the tapered rollers to prevent the rollers from slipping out from the bearing and thereby holds the bearing together. At the point of contact between the retaining or thrust flange and the rollers there is produced a constant sliding friction when the bearing is in use. This point of friction has been called the "sore-spot" of the bearings by the industry, but attempts to eliminate it have not been satisfactorily solved.

The friction at the so-called "sore-spot" is caused in four ways. The first is the rotation of the inner cone with the flange in one direction with a sidewise friction at the end of the rollers which disaligns the rollers from the critical apex point. Secondly, the rollers also rotate but in the opposite direction to that of the inner cone and increases the sidewise friction. Thirdly, when a radial load is applied to the roller bearing the rollers bear the weight of the load. Due to the slant of the races, the rollers are pushed in an outward direction against the retaining flange with an increase in the friction. When an axial or thrust load is applied to the tapered bearing the fourth cause of friction arises due to the cone being pushed inward in an axial direction. The retaining flange therefore presses inwardly on the rollers causing additional friction.

The solution of the problem by U.S. Patent No. 2,734,787 is based on the adhesive and cohesive characteristics of lubricants, such as oil or grease, and one or more free floating annular rings between the retaining or thrust flange and the thicker end of the roller bearing. The free floating rings distribute the axial and radial forces evenly over all the rollers to avoid undue friction on any particular portion of the rollers. The lubricant absorbs a certain amount of pressure due to its viscosity and reduces the sharp impacts between the rollers and the retaining flanges. If more than one free floating annular ring is used, the lubricant between the plurality of rings slows the speed of rotation of the rings in comparison to the retaining flange and the rollers and thereby reduces the friction.

It is an object of the invention to provide a tapered roller bearing in which the friction between the thrust flange of the inner bearing cone and the base of the rollers is materially reduced, replacing lubrication by mechanical means.

It is another object of the invention to provide a tapered roller bearing with anti-friction bearings between the thrust or retaining flange of the inner bearing cone and the base of the rollers whereby friction between these parts is substantially reduced.

It is a further object of the invention to provide a tapered roller bearing with bearings and a free floating anti-friction annular ring between the thrust flange of the cone and the base of the rollers whereby friction between these parts is eliminated and whereby wear between the said parts may be compensated for by replacing the annular ring with an anti-friction ring carrying ball or roller bearings suspended from the cage or from pintles on said roller bearings.

These and other objects and advantages of the invention will become obvious from the following detailed description.

Referring to the drawings, which are illustrative of various preferred embodiments of the invention, FIGS. 1 and 2 are partial plan views of tapered roller bearings which show the use of ball bearings in a crate loosely mounted on the cage inserted between the thrust flange of the cone and the base of the rollers.

Figure 1:
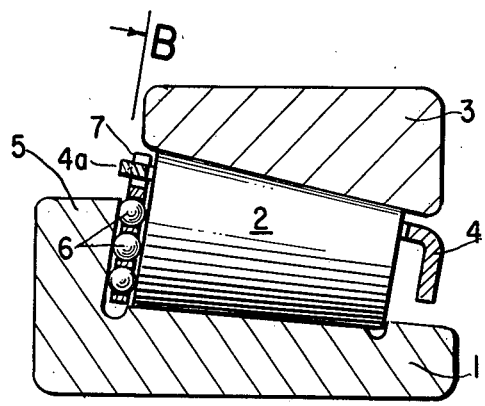

In the embodiment illustrated in FIG. 1 the inner cone of the bearing is indicated at 1, the roller is indicated at 2, the outer race or cup at 3 and the cage for the roller at 4. The inner bearing cone 1 has a thrust flange 5 which in the ordinary bearing rests against the base of the roller 2, but in the present bearing bears against the ball bearings 6 which are in a crate 7 loosely mounted on cage 4. The ball bearings 6 move with the tapered roller bearings 2 so that the same ball bearings 6 remain in front of the same tapered roller 2 at all times.

In the past the cage 4 has only been used to space the tapered rollers 2 and to hold them in assembly on the inner cone or raceway, but in the present embodiment of the invention it is also used to keep the crate 7 containing the ball bearings 6 in position with the same roller 2 at all times. The crate 7 may be attached to the cage 4 by any means, such as spot welding or by notching or mortising the crate 7 into the extending ends 4a of the cage 4. Whenever any load is exerted on the tapered roller bearing the thrust flange 5 and the tapered roller 2 come in contact with the ball bearings 6 and the only friction is that caused by the rolling of the ball bearing 6. There is no sidewise friction created and the tapered rollers 2 are not forced from alignment with their apex point. Normally the balls 6 carry little load and act as free floating anti-friction members which come into play and reduce friction only when the bearing is called upon to absorb axial thrust.

Figure 2:
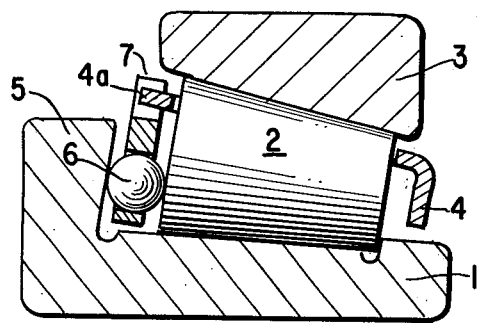

FIG. 1 shows the use of three rows of ball bearings 6 in the crate 7 while FIG. 2 shows the use of a single row of ball bearings 6 in the crate 7.

Figure 3:
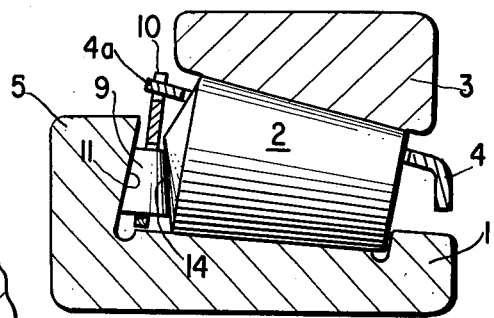
FIG. 3 is similar to FIG. 1 but shows the use of roller bearings attached to the cage of the rollers.

FIG. 3 shows the use of a tapered roller bearing 9 in a crate 10 which is attached to the cage 4 and performs the same function as the ball bearings 6 in FIGS. 1 and 2. The thrust flange 5 has a slanting face 11 and the tapered rollers 2 have a conical base 14 to provide a suitable surface for the varying thickness of the tapered roller 9. This embodiment is particularly advantageous in the large bearings of heavy machinery where thrust loads on the tapered roller bearings are extreme.

Figure 4:
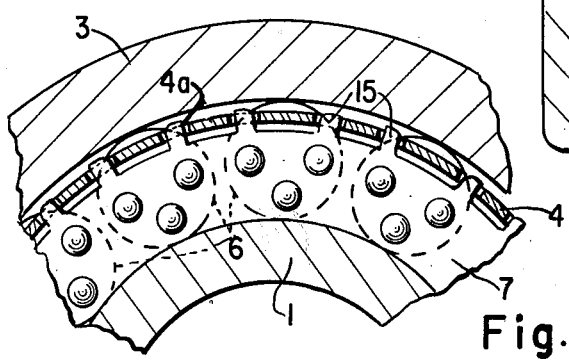
FIG. 4 is a partial plan view in cross-section taken along the line B—B' of FIG. 1.

FIG. 4 illustrates one way to attach the crate 7 to the cage 4 by notching the end 4a of the cage 4. The crate 7 containing the ball bearings 6 has projections 15 which are spaced to coincide with notches 4a in the cage 4 which holds the crate 7 in position with the tapered roller 2. When the cage 4 moves about the inner cone the crate 7 and the ball bearing 6 will move with it and thereby always remain in position with the same tapered roller 2.

The bearings 6 or 2 are made of any suitable hard metal, but steel is the usual metal used.

While the preferred forms of embodiments of the invention have been illustrated, various modifications of the invention may be made without departing from the spirit or scope thereof and it is to be understood that the invention is to be limited only as defined in the appended claims.

I claim:

1. In a tapered roller bearing comprising an inner bearing cone, an outer bearing cup and a plurality of one piece frustro-conical rollers having a conical thick base and a cage therebetween, a thrust flange on said inner bearing cone with a slanting surface facing the conical base of the said rollers and a crate containing tapered roller bearings between the thrust flange and the conical base of the said rollers, the said crate being loosely mounted on a projection of the cage.

2. In a tapered roller bearing comprising an inner bearing cone, an outer bearing cup and a plurality of one piece frustro-conical rollers having flat planar bases and a cage therebetween, a linear thrust flange on said inner bearing cone parallel with the base of said rollers and a crate containing ball bearings which is loosely mounted on a projection of the said cage and is between the thrust flange and the base of the rollers.

References Cited in the file of this patent

UNITED STATES PATENTS

| | | |
|---|---|---|
| 931,924 | Hess | Aug. 24, 1909 |
| 1,131,694 | Goble | Mar. 16, 1915 |
| 1,180,586 | Huther | Apr. 25, 1916 |
| 1,945,094 | Strickland | Jan. 30, 1934 |
| 1,995,838 | Buckwalter | Mar. 26, 1935 |